(12) United States Patent
Wegner et al.

(10) Patent No.: US 12,545,178 B2
(45) Date of Patent: Feb. 10, 2026

(54) INDUSTRIAL TRUCK HAVING A LIGHTING DEVICE, LOGISTICS SYSTEM HAVING MULTIPLE INDUSTRIAL TRUCKS, METHODS FOR OPERATING THE LIGHTING DEVICE AND THE LOGISTICS SYSTEM

(71) Applicant: Jungheinrich AG, Hamburg (DE)

(72) Inventors: Christian Wegner, Moorrege (DE); Clemens Albrecht, Henstedt-Ulzburg (DE)

(73) Assignee: Jungheinrich AG, Hamburg (DE)

( * ) Notice: Subject to any disclaimer, the term of this patent is extended or adjusted under 35 U.S.C. 154(b) by 224 days.

(21) Appl. No.: 18/242,720

(22) Filed: Sep. 6, 2023

(65) Prior Publication Data

US 2024/0092258 A1  Mar. 21, 2024

(30) Foreign Application Priority Data

Sep. 15, 2022  (DE) .................... 10 2022 123 668.4

(51) Int. Cl.
*B60Q 1/50*  (2006.01)
*B60L 1/14*  (2006.01)
*B66F 9/075*  (2006.01)
*B60L 53/00*  (2019.01)

(52) U.S. Cl.
CPC ............. *B60Q 1/543* (2022.05); *B60L 1/14* (2013.01); *B66F 9/075* (2013.01); *B60L 53/00* (2019.02); *B60L 2200/42* (2013.01); *B60L 2200/44* (2013.01)

(58) Field of Classification Search
None
See application file for complete search history.

(56) References Cited

U.S. PATENT DOCUMENTS

| | | | |
|---|---|---|---|
| 9,975,472 B2* | 5/2018 | Wadell | B66F 9/24 |
| 2005/0093509 A1* | 5/2005 | Liang | H02J 7/0048 |
| | | | 320/114 |
| 2010/0066563 A1* | 3/2010 | Harrington | G09F 21/048 |
| | | | 340/937 |
| 2011/0077809 A1* | 3/2011 | Leary | B60L 53/14 |
| | | | 320/109 |
| 2017/0275145 A1* | 9/2017 | Laker | B66F 9/07504 |
| 2018/0105048 A1* | 4/2018 | Hsu | B60L 53/38 |
| 2020/0114815 A1 | 4/2020 | Massengill et al. | |
| 2020/0193837 A1 | 6/2020 | Grolle | |
| 2021/0261047 A1 | 8/2021 | Claesson et al. | |
| 2023/0311750 A1* | 10/2023 | Burger | G08B 5/36 |
| | | | 315/77 |

FOREIGN PATENT DOCUMENTS

DE  10 2018 108 468 A1  10/2019

* cited by examiner

*Primary Examiner* — Daniel L Greene
(74) *Attorney, Agent, or Firm* — Scully, Scott, Murphy & Presser, P.C.

(57) ABSTRACT

An industrial truck having a lighting device, a logistics system having multiple industrial trucks as well as methods for operating the lighting device as well as the logistics system. The industrial truck includes at least one vehicle light and a controller for actuating the vehicle light. The controller is configured to capture at least one vehicle state parameter and to actuate the vehicle light in a pattern based on the at least one vehicle state parameter.

18 Claims, 5 Drawing Sheets

INDUSTRIAL TRUCK HAVING A LIGHTING DEVICE, LOGISTICS SYSTEM HAVING MULTIPLE INDUSTRIAL TRUCKS, METHODS FOR OPERATING THE LIGHTING DEVICE AND THE LOGISTICS SYSTEM

CROSS-REFERENCE TO RELATED APPLICATION

The present application is based upon and claims the benefit of priority from DE 10 2022 123 668.4 filed on Sep. 15, 2022, the entire contents of which is incorporated herein by reference.

BACKGROUND

Field

The present disclosure relates to an industrial truck and more particularly to an industrial truck having a lighting device, comprising at least one vehicle light and a control unit (i.e., controller) for actuating the vehicle light. The present disclosure further relates to a logistics system having at least one charger and an electrically driven industrial truck having a lighting device. Furthermore, the present disclosure relates to a logistics system, comprising a comparison unit (i.e., controller) and at least one first and a second such industrial truck. In addition, the present disclosure relates to a method for operating a lighting device of an industrial truck, wherein the lighting device comprises at least one vehicle light and a control unit for actuating the vehicle light. The present disclosure furthermore relates to a method for operating a logistics system, comprising a comparison unit and at least one first and a second industrial truck.

Prior Art

Industrial trucks comprise vehicle lighting, which comprises various vehicle lights, which, however, are only partially comparable to the vehicle lights of a lighting device of a motor vehicle operated on public roads. The vehicle lighting of a motor vehicle approved for road traffic is subject to statutory provisions. Specific vehicle lights are provided for specific functions, to each of which fixed colors are additionally assigned. For example, the vehicle lighting comprises inter alia vehicle lights for high beam, low beam and parking lights, for the turn indicator (turn signal), tail lights (rear lights) and brake lights, etc.

Industrial trucks, which are not operated on public roads, are not governed by the statutory provisions but, as a general rule, they do likewise have the prescribed vehicle lighting. In addition to the vehicle lighting, industrial trucks can be equipped with further vehicle lights, for example, warning lights or the like. In many cases, these additional vehicle lights are mounted on the industrial truck for a very specific purpose and display, for example, that the industrial truck is ready for operation.

SUMMARY

An object is to indicate an industrial truck having a lighting device, a logistics system, comprising multiple such industrial trucks, a method for operating a lighting device of an industrial truck as well as a method for operating such a logistics system, wherein the aim is to make it possible to communicate information relating to the industrial truck simply and efficiently by visually indicating to a person within sight of the industrial truck.

Such object can be solved by an industrial truck having a lighting device, comprising at least one vehicle light and a control unit for actuating the vehicle light, wherein the control unit can be configured to capture at least one vehicle state parameter and to actuate the vehicle light in a pattern based on the at least one vehicle state parameter.

Vehicle status information characterized by the vehicle state parameter can be communicated via one or more vehicle lights present on the industrial truck. Thus, a person within sight of the industrial truck can simply and quickly obtain information relating to the at least one vehicle state parameter. In this way, the person, for example, a logistics employee, can quickly and efficiently, for example, find an industrial truck, which can be suitable or provided for a specific task.

Furthermore, it is not necessary to mount an additional vehicle light on the industrial truck specifically for the purposes of visually communicating the vehicle information. In other words, the vehicle light can be a vehicle light, which can be already present on the industrial truck, and which can also fulfil another task in another context.

The pattern, in which the vehicle light can be actuated by the control unit can be a color, a luminosity and/or a rhythmic sequence of the emitted light signals.

If the vehicle light comprises multiple light sources, for example, a LED light band, the actuation of individual selected light sources, for example, of the LED light band, the actuation of multiple light sources of the vehicle light or the actuation of all of the light sources can be provided as a possible pattern. Said pattern in which the light sources are actuated can be combined with a further pattern, which, for example, can comprise the luminosity and/or a rhythmic sequence. The result can be a combined pattern, for example, a dynamic light pattern.

The vehicle state parameter can characterize a state of the industrial truck or a state of at least one of its components, modules or integral parts. The vehicle state parameter can characterize a parameter of an energy store, for example of a traction battery, of the industrial truck. The vehicle state parameter can indicate a state of charge, a maximum storage capacity and/or a state of the traction battery of the industrial truck. Starting from said information, the vehicle light is, for example, actuated as a function of the state of charge in a pattern, which characterizes the state of charge. For example, the vehicle light can be activated in a red color if the state of charge is below a specific limit value, for example, is less than 10%. If the state of charge is in a predefined middle range, for example between 10% and 70%, the vehicle light can be activated in a yellow color. If the state of charge is above a specific limit value, for example greater than 70%, the vehicle light can be actuated in a green color. The logistics employee can recognize the state of charge of the industrial truck quickly and easily.

Furthermore, the vehicle state parameter can, for example, display a service requirement of the industrial truck. The vehicle light can be, for example, activated such that it flashes red. The logistics employee can thus immediately recognize that the industrial truck is the one on which a service order is to be fulfilled. The vehicle state parameter can characterize a value of an error memory of the industrial truck.

According to an embodiment, the at least one vehicle light can be arranged in a top half, such as in a top third, or in a top quarter of a body of the industrial truck.

The arrangement of the vehicle light in the indicated regions of the body of the industrial truck, that is to say in a top region of the industrial truck, can make it possible to recognize the light signals emitted by the vehicle light even at a great distance or in a situation in which the industrial truck is partially concealed. The indicated top fraction (half, third, quarter) of the body of the industrial truck can be, for example, determined with regard to the maximum height of the body of the industrial truck. The maximum height can be, for example, determined in the region of a roof construction at the highest point of the industrial truck, apart from the mast thereof. For example, the top half of the body of the industrial truck can be that region of the body, which extends above half the maximum height of the body. The same applies to the top third or the top quarter of the body. According to further embodiments, the vehicle light can be arranged in the region of a roof construction of the industrial truck or at the highest point of the body of the industrial truck. As already mentioned, the high position of the vehicle light on the body can improve the visibility thereof.

According to a further embodiment, the vehicle light can be a part of the vehicle lighting of the industrial truck.

The use of a vehicle light, which can be part of the vehicle lighting of the industrial truck, can be deployed for the indicated purposes without the need to mount an additional vehicle light on the industrial truck. The vehicle lighting of the industrial truck can typically comprise a front light, which can be comparable to a daytime running light on passenger cars and a rear light in order to improve the visibility of the vehicle during operation. As a general rule, industrial trucks are not operated on public roads and therefore, as a general rule, do not have the vehicle lights provided for in pursuance of the regulatory requirements either. However, the vehicle lights present can be actuated to display the vehicle state parameter in a pattern, which can be characteristic of the vehicle state parameter.

In connection with this, the vehicle lights of the vehicle lighting can be actuated in a color which deviates from the usual colors as provided, for example, for operation on public roads. Due to this non-intuitive coloring, the light signal emitted by the industrial truck can be directly recognized by the viewer as a pattern, which indicates a vehicle state parameter. In addition, thanks to this deviation, it can be easily possible to recognize that the light signal, which can be emitted by the corresponding vehicle light, is not related to the normal operation of the industrial truck, but represents an item of information relating to the vehicle parameter. For example, the driving lights, which can be operated with white light in normal operation, can be actuated in various colors in order to thus display the state of charge of the traction battery. For example, the colors red, yellow and green can be deployed, as already explained earlier in the text.

According to a further embodiment, the control unit can be furthermore configured to capture a proximity signal and, in response to a successful capturing of the proximity signal, to activate an actuation of the vehicle light.

The proximity signal can be transmitted by suitable and generally known wireless communication technology for short distances such as, for example, Bluetooth or WLAN. For example, a logistics employee can carry a personal user end device or tag, which can send out the proximity signal. The capturing of said proximity signal can output a corresponding light signal at the vehicle lighting when the logistics employee approaches, without the need for a separate activation of said signal.

For example, when a service employee approaches, the industrial truck can display a message by a corresponding light signal directly to said service employee that the vehicle parameter indicates a service requirement of the industrial truck. The service employee can thus turn his attention directly to said industrial truck and perform the corresponding service work.

According to further embodiments, the vehicle state parameter can be an equipment feature of the industrial truck, a state of charge of a traction battery of the industrial truck, an operational readiness of the industrial truck and/or a service requirement of the industrial truck.

The vehicle state parameter can be an internal vehicle state parameter. The pattern, in which the vehicle light can be actuated by the control unit, can characterize a value of said vehicle state parameter.

For example, the pattern can be selected such that a specific equipment feature of the industrial truck can be displayed. Said equipment feature can relate, for example, to the functionality of the industrial truck. Thus, a specific color code can, for example, display that the industrial truck is configured to execute a specific function. Another color code or a rhythm of the actuation of the vehicle light can, for example, indicate that the industrial truck is configured to be operated in a specific way. Thus, for example, a classification of the industrial trucks can be carried out. If, for example, a logistics employee merely has approval to operate a specific type of industrial truck, e.g., because said logistics employee has not yet completed specific internal training programs and qualifications, the industrial truck can thus display, for example, by a corresponding color code: red (no access) and green (access permitted) that the logistics employee concerned is entitled to operate the industrial truck.

In connection with this, vehicle lights which are part of the vehicle lighting of the industrial truck can be actuated in another color deviating from their usual or prescribed color in accordance with the provided pattern (which can include the color). For example, a specific equipment feature of the industrial truck can be displayed by a green-colored light signal, although green is not a color in which a vehicle light of the vehicle lighting is operated according to the usual color scheme.

The state of charge of a traction battery of the industrial truck can likewise be displayed, for example, by using appropriate color coding. This can also be effected in combination with an operational readiness of the industrial truck. For example, a green-colored light signal can display that the charging process of the traction battery has ended. A white light signal can display that the industrial truck is fully operational. By way of contrast, a yellow or orange light signal can display that the charging process of the traction battery has not yet been completed. A red light signal can display a system error of the industrial truck, whilst a flashing red can display a critical system error. Thus, a user of the industrial truck can be extensively informed about the state of the industrial truck on the basis of the light signals thereof.

An individual vehicle light can be used for displaying all of these states. In the context of the present description, the term "vehicle light" is not to be understood in such a restrictive way that said light has to be an individual separate vehicle light. A "vehicle light" can likewise be a light segment of a larger lighting unit.

According to a further embodiment, the vehicle state parameter can be linked to multiple authorization categories and the proximity signal comprises an item of information relating to an authorization category, and wherein the control unit can be configured, in response to a successful capturing of the proximity signal, to compare the authorization category of the vehicle state parameter and the authorization category of the proximity signal and to carry out an actuation of the vehicle light as a function of a comparison result.

For example, the authorization categories can be authorizations for a service technician, a warehouse employee and a warehouse manager. Depending on which authorization category is recognized in the proximity signal, that is to say, for example, one of the three aforementioned categories, the industrial truck can compare said category with the category of the vehicle state parameter. If the vehicle state parameter relates to, for example, a service requirement and a service technician approaches in accordance with the authorization category present in the proximity signal, the industrial truck can come to a positive comparison result and, for example, actuate the vehicle light with a green light signal. By way of contrast, if, for example, a warehouse employee or a warehouse manager approaches, the corresponding comparison result would be negative, and the vehicle light can emit a red light signal, displaying to the warehouse employee and warehouse manager that the corresponding industrial truck is blocked for normal operation.

If, for example, the vehicle state parameter relates to a specific equipment feature, an authorization category can, in turn, be derived from the presence of said equipment feature, for example, an assistance system, which can be present for automatic braking engagement or the like. If, for example, a warehouse employee approaches, who, on the basis of an operational recommendation, should always operate vehicles with an assistance system for automatic braking engagement, said authorization category can be integrated into a proximity signal. The authorization category can be transmitted by a mobile unit, which can be carried by said warehouse employee, together with the proximity signal. In the event of communication to this effect and reception of such a categorized proximity signal by an industrial truck, the industrial truck can, in turn, perform a comparison and, for example, in the case that the equipment feature "Assistance system for automatic braking engagement" exists on the industrial truck concerned, come to a positive comparison result. In this case, the industrial truck can, for example, actuate the green-colored vehicle light in order to display to the warehouse employee that the industrial truck concerned has the equipment provided for him. The procedure can be similar if a warehouse employee, for example, requires special training in order to be allowed to operate a specific industrial truck or industrial trucks of a specific category. In such a case, the equipment feature can be, for example, the maximum possible lifting load or lifting height. For example, if specific limit values are exceeded, additional training can be required. In this case, the authorization category of the employee would state whether the latter has corresponding training, that is to say is authorized to operate industrial trucks which have the equipment feature in question. The industrial truck can, in turn, actuate the vehicle light with a corresponding light signal depending on the comparison result.

According to a further exemplary embodiment, the vehicle state parameter can again be a service requirement of the industrial truck. The existence of a service requirement, for example the existence of a service order, would be reflected in the corresponding authorization category. If a service employee now approaches the industrial truck, the proximity signal which can be sent out by a mobile unit which the service employee can be carrying, in turn comprises information relating to the latter's own authorization category, which can identify the owner of the mobile unit as a service worker. The existence of a service order and the identification of the employee as a service employee leads to a positive comparison result. Accordingly, the industrial truck can output a light signal at the vehicle light, which displays that the industrial truck requires a service.

In addition, the control unit can be configured to block the vehicle for further requests as soon as a positive comparison result has been found so that, for example, the service can be performed in any case.

According to a further embodiment, the vehicle state parameter can relate, for example, to an equipment feature of the industrial truck, a state of charge of a traction battery of the industrial truck, an operational readiness of the industrial truck and a service requirement of the industrial truck. From these parameters (in such a case, the vehicle state parameter can be an array or vector), individual sub-parameters can be prioritized over others for the reproduction of a corresponding light signal. For example, the service requirement can be prioritized over further parameters. Equally, for example, a service requirement can be prioritized over the display of a state of charge of the traction battery. It can, in turn, be fixed which vehicle parameters are displayed on the basis of the authorization category which is present in the proximity signal. For example, the proximity signal in the associated authorization category can indicate that merely one of the aforementioned three sub-parameters can be displayed, for example, a state of charge of the traction battery can be displayed to the warehouse employee and, on the other hand, the service requirement can be displayed to the service technician.

The authorization category can, in addition, be an authorization to operate the industrial truck in question. To this end, a corresponding list of authorized vehicle drivers can exist, for example, in the control unit, if necessary, additionally taking into account the respective individual qualifications or restrictions regarding equipment features and/or assistance systems present.

According to a further embodiment, the vehicle state parameter can be an internal vehicle state parameter and the control unit can be configured to capture the internal vehicle state parameter and at least one vehicle state parameter of at least one further industrial truck as at least one external vehicle state parameter, to compare the internal and the at least one external vehicle state parameter with one another and to actuate the vehicle light in a pattern which can be based on a result of the comparison of the vehicle state parameters.

That is to say, the control unit can be configured to carry out a comparison between at least one internal vehicle parameter and one or more external vehicle state parameters. In this way, a property of the industrial truck can be ascertained and displayed in comparison with other industrial trucks. If the vehicle state parameter is, for example, the state of charge of the traction battery of the respective industrial truck, the industrial truck can compare the state of charge of its own traction battery with the state of charge of the traction battery of a further industrial truck. Subsequently, a light signal can be output at the vehicle light, the pattern of which can be based on a result of said comparison.

Contrary to what was already mentioned earlier in the text, not only can the absolute value of the state of charge of the industrial truck's own traction battery now be indicated, for example, color coded, but rather this can be quantified with respect to the state of charge of the traction battery of the other industrial truck. Thus, for example, an industrial truck with a green flashing vehicle light can display that it has the higher state of charge of the traction battery compared to the at least one further industrial truck. Since repeated intermediate charging of the traction battery is becoming more and more important in practical applications, the industrial truck having the comparatively higher battery charge can be used for immediate operation.

A similar display can also be possible, for example, with respect to a service requirement of an industrial truck compared to another industrial truck. If an industrial truck has a lower service requirement than another industrial truck, this can, for example, be displayed with a green light signal. For example, the maintenance interval in the case of this industrial truck is even longer or has not yet fallen below a critical value. A logistics employee can now select that vehicle which does not yet have an acute service requirement. Therefore, it can be possible to avoid unnecessary wear of the industrial trucks. That is to say that, due to the communication of the industrial trucks with one another and a corresponding actuation of the vehicle light as a function of the result of a comparison, which can be performed, the operation of a vehicle fleet as a whole can be improved.

The comparison performed can be, for example, a greater/lesser comparison, the determination of a maximum or minimum, the clarification of the question of whether specific characteristics such as, for example, equipment features of the industrial truck, exist or not, that is to say a binary true/false comparison.

In the context of the present description, capturing a parameter can be understood to mean both receiving a corresponding parameter and requesting a corresponding parameter. Of course, the receiving and active requesting can also be combined with one another. The vehicle light does not have to be configured as an individual separate vehicle light. It can likewise be a segment of a larger light unit. The industrial truck can be an electrically driven industrial truck. The indicated features relate to all embodiments.

Such object can be furthermore solved by a logistics system having at least one charging unit and an electrically driven industrial truck having a lighting device, comprising a vehicle light and a control unit for actuating the vehicle light, wherein the control unit can be configured to capture at least one state parameter of the charging unit and to actuate the vehicle light in a pattern based on the at least one state parameter of the charging unit.

The same or similar advantages as well as the same and similar development options apply to said logistics system, as have already been mentioned with respect to the industrial truck itself. The only difference is that it is not a state parameter of the industrial truck, but rather a state parameter of the charging unit.

According to a further embodiment, said logistics system can be developed by a central computer, which can also be implemented as a functional unit in a cloud, wherein the central computer can be configured to request the state parameter of the charging unit and to communicate it to the industrial truck. According to a further embodiment, the industrial truck can request the state parameter of the charging unit from the central computer. That is to say that, in other words, the state parameter of the charging unit does not have to be communicated directly between the charging unit and the industrial truck, but rather can be communicated according to the indicated embodiments, such as, via the central computer.

Such object can be furthermore solved by a logistics unit, comprising a comparison unit and at least one first and a second industrial truck according to one or more of the previously indicated embodiments, wherein a first control unit of the first industrial truck can be configured to capture a first internal vehicle state parameter and to transmit it to the comparison unit and a second control unit of the second industrial truck can be configured to capture a second internal vehicle state parameter and to transmit it to the comparison unit, wherein the comparison unit can be configured to compare the first and the second vehicle state parameter with one another, to produce a comparison result and to generate a first and a second control signal, wherein the first control signal characterizes a ratio of the first vehicle state parameter to the comparison result and the second control signal characterizes a ratio of the second vehicle state parameter to the comparison result, and wherein the comparison unit can be furthermore configured to transmit the first control signal to the first control unit and to transmit the second control signal to the second control unit, wherein the first control unit can be configured to actuate a first vehicle light of the first industrial truck in a first pattern based on the first control signal and the second control unit can be configured to actuate a second vehicle light of the second industrial truck in a second pattern based on the second control signal.

In such a logistics system, industrial trucks of the fleet can be categorized or identified with respect to various vehicle state parameters on the basis of the light signals displayed by their vehicle lights. For example, the industrial truck can be displayed with the highest state of charge of the traction battery, for example, by a green flashing light signal. It can equally be displayed that an individual industrial truck is not operational or is blocked or that a system error exists on said industrial truck, so that a service technician can turn his attention directly to said industrial truck. The display of said vehicle state parameters compared to the vehicle state parameters of further industrial trucks in the fleet can make it possible to utilize the vehicle fleet efficiently.

The comparison of the vehicle state parameters performed for this purpose can be effected in the comparison unit. Said comparison unit can be implemented at various locations of the logistics system. According to an embodiment, it is for example provided that the logistics system can comprise a central computer which, in turn, can comprise the comparison unit. For the purposes of data communication, the central computer can be coupled by data technology to the first and the second industrial truck. The central computer can be implemented in a cloud; the same applies to the comparison unit. The comparison unit and/or the central computer can communicate with the individual industrial trucks via appropriate connections by data technology.

After a corresponding comparison of the vehicle state parameters has been performed in the comparison unit of the central computer, corresponding control signals can be communicated to the industrial trucks. On the basis of said control signals, the industrial trucks in turn can carry out an actuation of the corresponding vehicle light or lights.

Apart from this comparison performed by a superordinate entity, the comparison unit can be arranged in the first or the second industrial truck, and the industrial trucks can be directly coupled by data technology to one another. Alternatively, the industrial trucks can communicate with one another via the central entity, that is to say for example, a control computer of the logistics system. In the case of direct communication, however, the superordinate entity can be dispensed with, such as, for example, the central computer of the logistics system, for the striven-for functionality of the industrial truck. The comparison unit can be, for example, implemented as a functional unit in the vehicle control of the industrial truck.

In addition to implementing the comparison unit in the superordinate central computer or in one of the industrial trucks, the comparison unit can be implemented in one or more charging units, which can be connected or coupled to the industrial trucks during a charging process.

According to such an embodiment, the logistics system can comprise a first and a second charging unit, wherein the first charging unit for charging a traction battery of the first industrial truck can be connected to the first industrial truck and the second charging unit for charging a traction battery of the second industrial truck can be connected to the second industrial truck, wherein the comparison unit can be arranged in the first or the second charging unit, and wherein the first and the second charging unit, the first charging unit and the first industrial truck and the second charging unit and the second industrial truck can be coupled by data technology to one another.

The comparison unit can be implemented as a function of the architecture of the logistics system. Each of the indicated locations can have individual advantages as a function of the desired functionality and the construction or the architecture of the logistics system. If, for example, the charging units of a logistics system are brought up to a current technical state and therefore renewed, the comparison unit can be provided directly in the new charging units and not to functionally equip each individual industrial truck accordingly with a comparison unit. The implementation of the comparison unit in a central computer requires comparatively little effort, but assumes the communication capability of the industrial truck with said central computer.

Such object can be furthermore solved by a method for operating a lighting device of an industrial truck, wherein the lighting device comprises at least one vehicle light and a control unit for actuating the vehicle light, wherein the control unit can capture at least one vehicle state parameter and actuate the vehicle light in a pattern based on the at least one vehicle state parameter.

The same or similar advantages apply to the method for operating the lighting device of the industrial truck as have already been mentioned with respect to the industrial truck as well as the logistics system, so that repetitions will be omitted.

The method can be further developed in that the control unit can furthermore capture a proximity signal and, in response to a successful capturing of the proximity signal, activate an actuation of the vehicle light.

By capturing a proximity signal on the approach of a person, for example, a service employee or a logistics employee, the industrial trucks can directly display a light signal, which can indicate a vehicle parameter. For example, on the approach of a service employee, that industrial truck, the vehicle parameter of which displays a service requirement, can emit a corresponding light signal. Equally, one or more industrial trucks can, for example, emit light signals, which display the respective state of charge of the traction battery when a logistics employee approaches. The proximity signal can be transmitted, for example, by Bluetooth, WLAN or any other communication technology suitable for wireless data communication over short distances.

According to a further embodiment, the proximity signal can be produced in a logistics system, wherein various zones to which different functions are assigned are defined within the logistics system. For example, zones having speed restrictions, warning zones, obstacle zones and the like can be defined within the logistics system.

A parking zone for industrial trucks can equally be defined, for example also in combination with a loading zone. If the logistics system ascertains that an employee is entering such a zone, for example the loading zone, the logistics system can produce a proximity signal. Said proximity signal can be received by the control unit of the industrial truck. That is to say that, in other words, the proximity signal can be produced directly in the industrial truck concerned due to the fact that a logistics employee is, for example, approaching said industrial truck. Alternatively or additionally, the proximity signal can be produced if it is ascertained in a central computer that a person has entered a corresponding zone. In order to detect the person approaching or entering the relevant zone, the latter can carry, for example, a mobile user end device, a tag or another device equipped with suitable communication technology.

According to a further embodiment, the vehicle state parameter can be an equipment feature of the industrial truck, a state of charge of a traction battery of the industrial truck, an operational readiness of the industrial truck and/or a service requirement of the industrial truck.

According to a further embodiment, the vehicle state parameter can be linked to multiple authorization categories and the proximity signal can comprise an item of information relating to an authorization category, and wherein, in response to a successful capturing of the proximity signal, the authorization category of the vehicle state parameter and the authorization category of the proximity signal can be compared and an actuation of the vehicle light can be carried out as a function of a comparison result.

According to a further embodiment, the vehicle state parameter can be an internal vehicle state parameter and the pattern can characterize a value of the vehicle state parameter.

Furthermore, the vehicle state parameter can be an internal vehicle state parameter and the control unit can capture the internal vehicle state parameter and at least one vehicle state parameter of at least one further industrial truck as at least one external vehicle state parameter, compare the internal and the at least one external vehicle state parameter with one another and actuate the vehicle light in a pattern which can be based on a result of the comparison of the vehicle state parameters.

Advantages associated with the aforementioned embodiments have likewise been explained with respect to the industrial truck itself and should therefore not be repeated.

Furthermore, such object can be solved by a method for operating a logistics system, comprising a comparison unit and at least one first and a second industrial truck in accordance with one or more of the embodiments indicated above, wherein a first control unit of the first industrial truck can capture a first internal vehicle state parameter and transmit it to the comparison unit and a second control unit of the second industrial truck can capture a second internal vehicle state parameter and transmit it to the comparison unit, wherein the comparison unit can compare the first and the second vehicle state parameter with one another, produce a comparison result and generate a first and a second control signal, wherein the first control signal can characterize a ratio of the first vehicle state parameter to the comparison result and the second control signal can characterize a ratio of the second vehicle state parameter to the comparison result, and wherein the comparison unit can furthermore transmit the first control signal to the first control unit and transmit the second control signal to the second control unit, wherein the first control unit can actuate a first vehicle light of the first industrial truck in a first pattern based on the first control signal and the second control unit can actuate a second vehicle light of the second industrial truck in a second pattern based on the second control signal.

Advantages relating to the operation of the logistics system have already been mentioned with respect to the logistics system itself, so that repetitions should be avoided.

The logistics system can comprise a first and a second charging unit, wherein the first charging unit for charging a traction battery of the first industrial truck can be connected to the first industrial truck and the second charging unit for charging a traction battery of the second industrial truck can be connected to the second industrial truck, wherein the comparison unit can be arranged in the first or the second charging unit, and wherein the first and the second charging unit, the first charging unit and the first industrial truck and the second charging unit and the second industrial truck can be in connection with one another by data technology.

BRIEF DESCRIPTION OF THE DRAWINGS

Further features will become evident from the description of embodiments, together with the claims and the appended drawings. Embodiments can fulfil individual features or a combination of multiple features.

The embodiments will be described below without restricting the general concept of the invention by means of exemplary embodiments with reference to the drawings, wherein reference is expressly made to the drawings regarding all of the details which are not explained in greater detail in the text, wherein, in the drawings.

In the drawings, the same or similar elements and/or parts are, in each case, provided with the same reference numerals such that they are not introduced again in each case.

DETAILED DESCRIPTION

Figure 1:
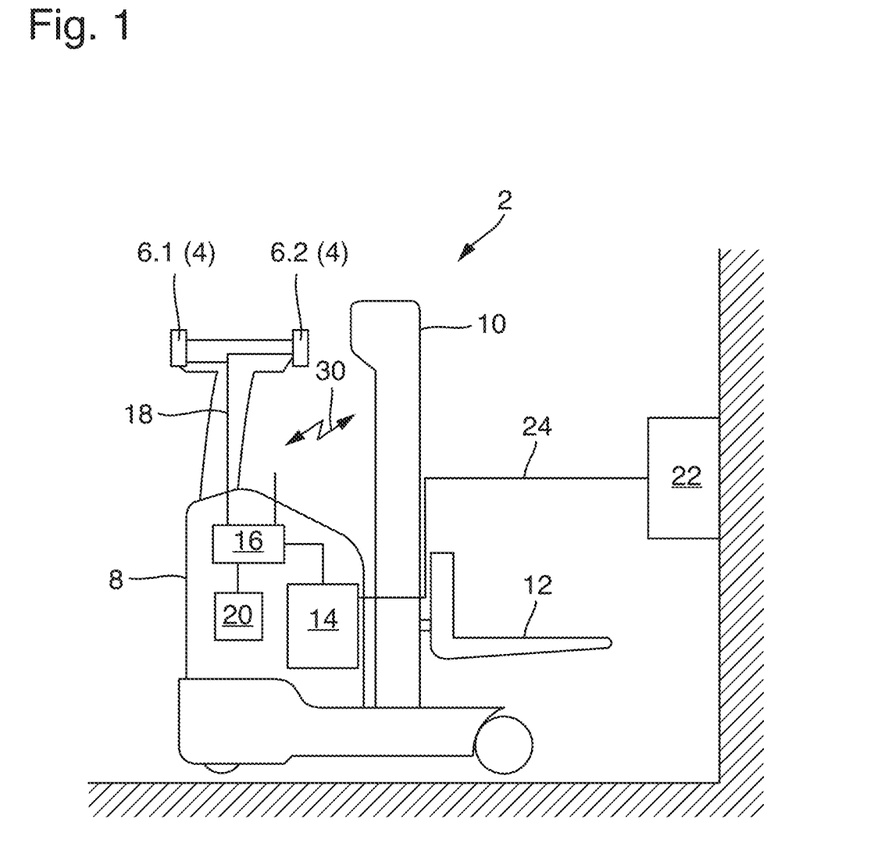
FIG. 1 to 3 each illustrate a schematic representation of an industrial truck having a lighting device, and FIGS. 4 and 5 each illustrate a logistics system having multiple industrial trucks.

FIG. 1 shows a schematically simplified view of an industrial truck 2 having a lighting device 4, which comprises, by way of example, two vehicle lights 6.1 and 6.2. In general, the vehicle lights collectively are designated with reference numeral 6. The industrial truck 2 comprises a body 8, which is positioned on a chassis. The industrial truck 2 is, for example, a forklift reach truck. The industrial truck 2 comprises the components typical of an industrial truck such as, for example, a mast 10 and a lifting fork 12. The industrial truck 2 is, by way of example, an electrically driven industrial truck 2. In order to supply power to the electric drive (not depicted), the industrial truck 2 comprises a traction battery 14.

In addition, the industrial truck 2 comprises a control unit 16 (a controller comprising hardware), which is configured and equipped for actuating the vehicle lights 6. The control unit 16 can be embodied as a separate unit or implemented as part of a vehicle controller 20. In order to actuate the vehicle lights 6, the control unit 16 is connected to the vehicle lights via suitable connection lines 18.

The control unit 16 is furthermore configured to capture at least one vehicle state parameter of the industrial truck 2. The vehicle state parameter is, for example, requested by the operation controller 20 of the industrial truck 2, or the control unit 16 requests the vehicle state parameter from a unit of the industrial truck 2, in which the vehicle state parameter exists. For example, the vehicle state parameter is a state of charge of the traction battery 14. The state of charge of the traction battery 14 can exist as a value in the vehicle controller 20 of the industrial truck. Alternatively, the control unit 16 can request the state of charge of the traction battery 14 directly at the traction battery 14. Further possible vehicle state parameters are, for example, an equipment feature of the industrial truck 2, an operational readiness of the industrial truck 2 and/or a service requirement of the industrial truck 2.

An equipment feature of the industrial truck 2 is, for example, the embodiment thereof as a forklift reach truck or the load-bearing capacity or maximum lifting height thereof. Further equipment features can relate, for example, to the type or operation of the industrial truck 2. Thus, it can be provided, for example, that particular qualifications have to be acquired for the operation of a specific type of industrial truck. The equipment feature can, for example, display whether such a particular qualification is required. Such information can be requested by the control unit 16 in the vehicle controller 20. A further possible equipment feature is, for example, the presence of an assistance system, which can be prescribed for specific users, or vice versa, for which the user has to have a specific qualification.

The same also applies to those exemplary embodiments in which the vehicle state parameter is an operational readiness of the industrial truck or a service requirement of the industrial truck. The operational readiness of the industrial truck 2 can likewise be stored in the vehicle controller 20. For example, the operational readiness refers to whether there is an error, a serious error or no error in the vehicle controller 20 of the industrial truck 2. A restricted operational readiness can also be stored in a corresponding parameter in the vehicle controller 20.

A service requirement of the industrial truck 2 can be stored in a further parameter, which is likewise present, for example, in the vehicle controller 20. Such a parameter can, for example, indicate whether there is an urgent service requirement or it can indicate a value for a remaining service interval. Such a parameter can likewise be fed from a cloud into the vehicle controller 20 of the industrial truck 2.

In order to, optionally, request the vehicle state parameters from the traction battery 14 or the vehicle controller 20, the control unit 16 is coupled to both the traction battery 14 and to the vehicle controller 20 via data lines which are not referred to in greater detail. These are, for example, usual communication connections in vehicle technology, for example, a bus system such as a CAN bus, DC bus, Ethernet or the like. The communication can take place digitally or in an analog manner.

Once the control unit 16 has captured the vehicle state parameter, it is in a position to actuate the vehicle light 6 in a pattern based on the vehicle state parameter. In the context of the present description, the term "pattern" comprises both the color of a light signal emitted by the vehicle light 6 and the switching rhythm thereof, for example, continuous light, flashing light in various rhythms, etc., and the intensity or luminosity thereof. For example, the control unit 16 can actuate the vehicle lights 6 in such a way that the latter display a state of charge of the traction battery 14 on the basis of the color of the light signal emitted. For example, a full traction battery can be displayed with a green color (e.g., state of charge>80%). An empty or insufficiently charged traction battery (e.g., state of charge<20%) can be displayed with a red light signal and an acceptably charged traction battery (state of charge between 20% and 80%) can be displayed with a yellow light signal. In addition, the operational readiness of the industrial truck can, for example, be displayed positively with a green light signal and negatively with a red light signal or a flashing red light signal. It is also possible to actuate the two vehicle lights 6.1, 6.2 differently for different purposes. For example, the first vehicle light 6.1 can output a light signal which provides information about the state of charge of the traction battery 14, while the second light signal 6.2 sends out a light signal which displays information about the operational readiness of the industrial truck 2.

The vehicle lights 6.1, 6.2 are arranged in a top region of the body 8. In this way, the vehicle lights 6 are clearly visible even from a distance. The vehicle lights 6 are located, by way of example, at the highest point of the body 8 of the industrial truck 2. In connection with this, the mast 10 is not considered to be part of the body of the industrial truck 2.

The industrial truck 2 is depicted, by way of example, in a situation in which said industrial truck is connected to a charging unit 22 via a charging cable 24.

Figure 2:
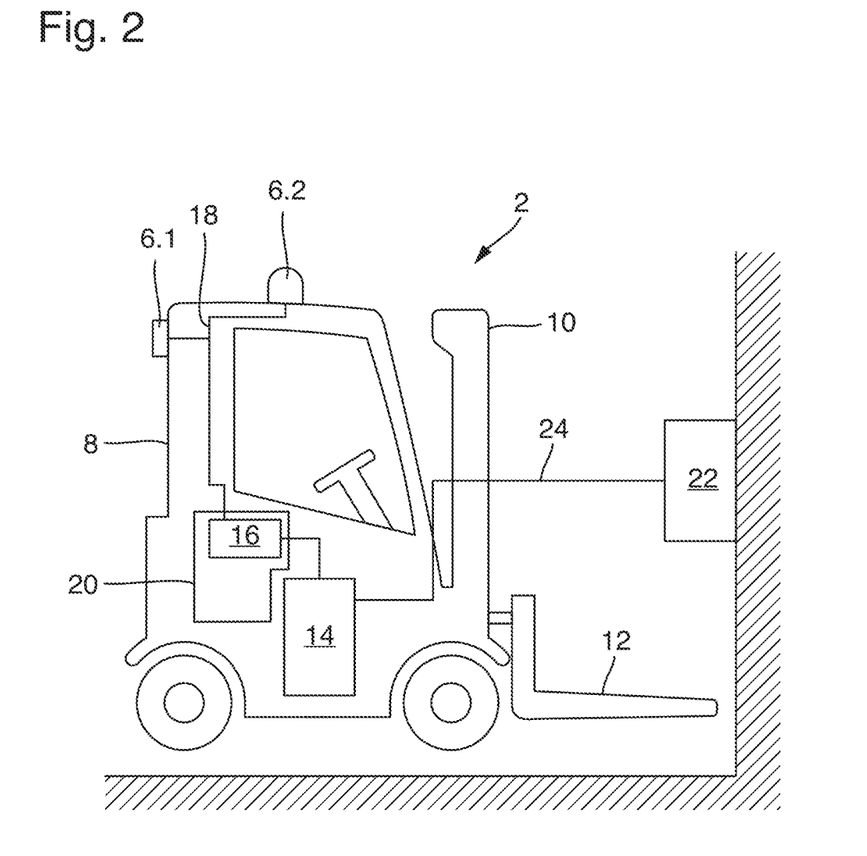

FIG. 2 shows a further schematically simplified view of an industrial truck 2 which is, by way of example, a counterbalanced fork-lift truck. The traction battery 14 is, for example, a lead-acid battery or a lithium-ion battery. The industrial truck in FIG. 2 is also connected to a charging unit 22 via a charging cable 24. The control unit 16 is implemented, by way of example, as part of the vehicle controller 20. The first vehicle light 6.1 of the industrial truck 2 is mounted in a top region of the body 8 shining backwards. As a second vehicle light 6.2, a rotating beacon, which is otherwise also provided as a warning light, is provided on the roof of the body 8. In order to actuate the vehicle lights 6, the latter are connected to the vehicle control 20 via corresponding connection lines 18.

Figure 3:
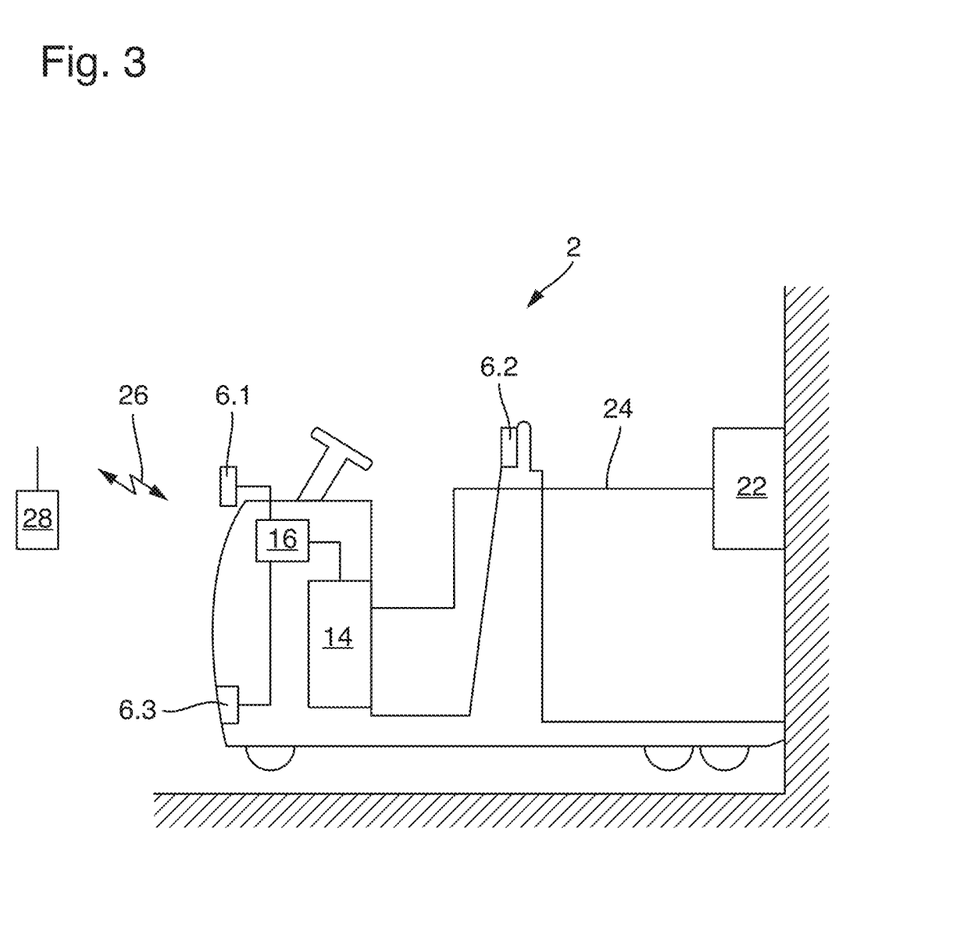

FIG. 3 shows a further industrial truck 2. By way of example, it is an order picker truck or electric tow tractor. The industrial truck 2 is, in turn, an electrically driven industrial truck and, for this purpose, comprises a traction battery 14. The industrial truck 2 comprises, by way of example, a first vehicle light 6.1 and a second vehicle light 6.2 which are mounted separately on the industrial truck 2. The third vehicle light 6.3 is, by way of example, the headlight of the industrial truck 2. That is to say that the third vehicle light 6.3 is a part of the vehicle lighting of the industrial truck 2. The industrial truck 2 is, in turn, depicted in a situation in which the traction battery 14 is charged and, for this purpose, is connected to the charging unit 22 with the aid of a charging cable 24.

The control unit 16 of the industrial truck 2 is furthermore configured to capture a proximity signal 26. In response to a successful capturing of the proximity signal 26, the actuation of one or more vehicle lights 6 is activated. The proximity signal 26 is, for example, sent by a mobile user end device 28 which, for example, a service employee is carrying. It is, for example, a mobile phone, PDA, tablet or the like or also a tag. The user end device 28 as well as the control unit 16 of the industrial truck 2 are equipped with appropriate communication technology for wireless data transmission over short distances (for example, WLAN or Bluetooth), so that the proximity signal 26 can be transmitted. If a user who is carrying the user end device 28 approaches the industrial truck 2, the proximity signal 26 is transmitted and the vehicle light 6 is activated. The user receives indications about the state of the industrial truck 2. The proximity signal 26 can contain further information, for example, indicate which vehicle parameter the light signal is to provide information about. For example, the proximity signal can already contain an item of information that a state of charge of the traction battery 14 should be displayed.

According to a further exemplary embodiment, it is provided that the industrial truck 2 has a vehicle state parameter which is linked to an authorization category. The proximity signal 26 is also linked to an item of information relating to an authorization category. The control unit 16 is configured, in response to a successful capturing of the proximity signal 26, to compare the authorization category of the vehicle state parameter and the authorization category of the proximity signal 26. As a function of the result of said comparison, an actuation of the vehicle light 6 is subsequently carried out.

For example, the vehicle state parameter is a service requirement of the industrial truck 2. In the associated authorization category, which is linked to said vehicle state parameter, it would be stored, for example, whether a service order exists or not. If a service employee now approaches the corresponding industrial truck 2, the latter's user end device 28 is configured to send out a proximity signal 26, which is linked to a relevant authorization category, in this case the authorization category "service employee". The outcome of the comparison, which is now carried out within the industrial truck 2 on the basis of the authorization category of the proximity signal 26 and of the vehicle state parameter is positive, since a corresponding service order does exist and the proximity signal 26 identifies the employee as a service employee. Accordingly, the control unit 16 can be configured, for example, to output a green light signal at the vehicle light 6, which displays to the service employee that said truck is the relevant industrial truck 2 scheduled for the service. At the same time, it can be provided that the control unit 16 blocks the industrial truck 2 for further use.

According to the previously explained embodiments, the vehicle state parameter is always an internal vehicle state parameter, which displays information about a state of the industrial truck in question 2 itself.

The control unit 16 of the industrial truck 2 explained in FIGS. 1 to 3 can be furthermore configured, according to further embodiments, to not only request and, consequently, capture an internal vehicle state parameter, for example from the vehicle controller 20 of the industrial truck 2, but rather to additionally capture at least one further external vehicle state parameter as well. The external vehicle state parameter is, for example, transmitted via a wireless data connection 30 (cf. FIG. 1) to the control unit of the industrial truck 2. It is equally conceivable that the data transmission takes place via the charging cable 24, starting from the charging unit 22 and via the traction battery 14. The external vehicle state parameter characterizes a vehicle state of a further industrial truck 2. The control unit 16 is configured to compare the internal and the at least one external vehicle state parameter with one another. According to such an embodiment, the vehicle light 6 is subsequently actuated in a pattern which is based on a result of the comparison of the two vehicle state parameters.

For example, the industrial truck 2 is sent the state of charge of the traction battery 14 of a further industrial truck 2 as an external vehicle state parameter. The control unit 16 subsequently compares said external state of charge with the state of charge of its own traction battery 14, the internal state of charge. If the internal state of charge is higher than the external state of charge, the vehicle light 6 can emit a corresponding light signal, for example flash green. In addition, a corresponding item of information about the result of the comparison can be fed back to the further industrial truck 2. This is likewise effected, for example, via the wireless data connection 30. The further industrial truck 2, which receives said information, can now be configured in that the control unit 16 thereof actuates the vehicle light 6 with yellow or red color corresponding to the result of the comparison, which is intended to indicate that the state of charge of the traction battery 14 of said industrial truck 2 is lower than the state of charge of another industrial truck 2. A user approaching these two industrial trucks 2 can, consequently, easily recognize at first glance which of the two industrial trucks 2 has the traction battery 14 with the better state of charge, and can put said industrial truck 2 into service while the other industrial truck 2 can be charged even further.

Figure 4:
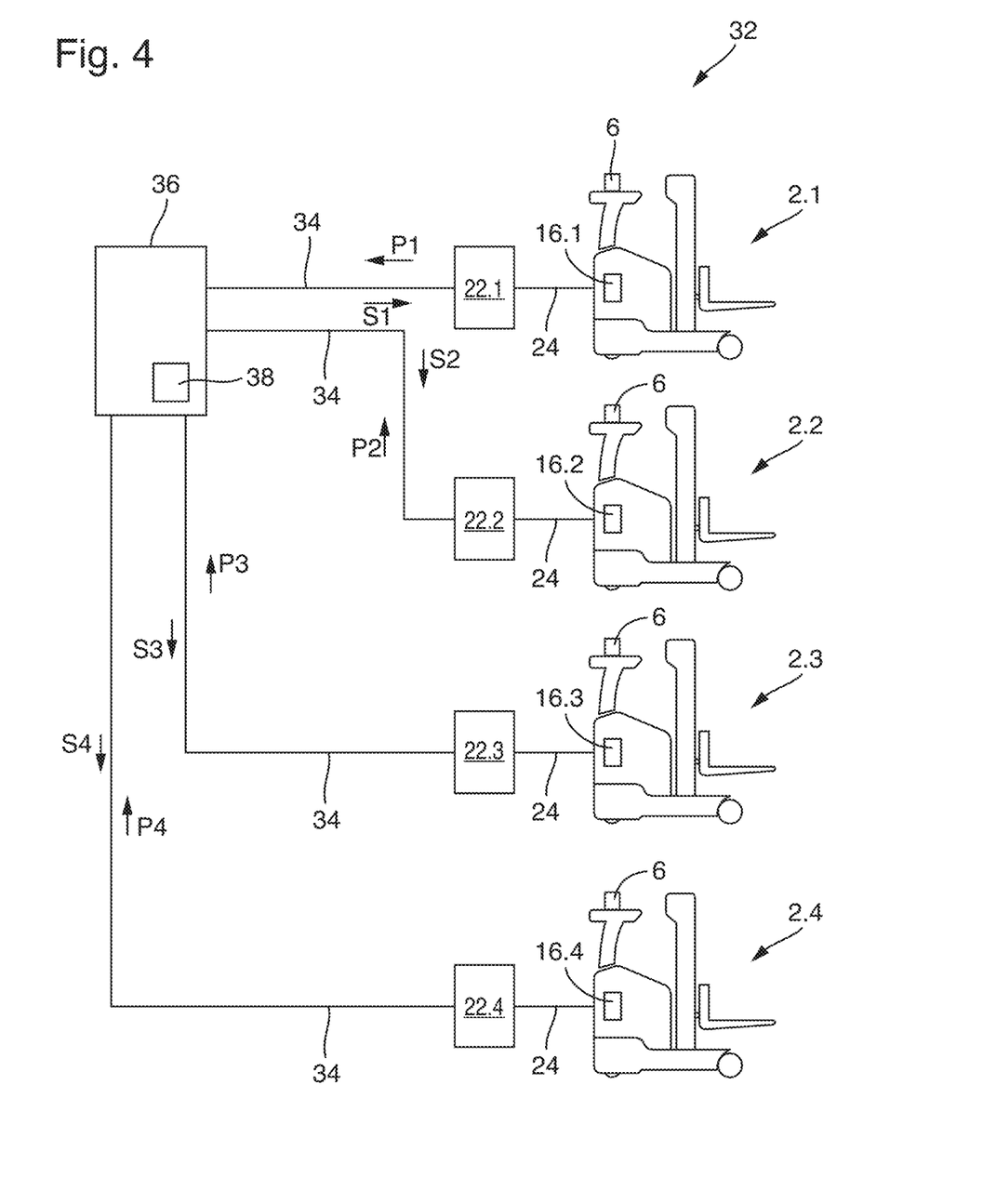

FIG. 4 shows a schematically simplified representation of a logistics system 32. The logistics system 32 comprises multiple industrial trucks 2; by way of example four industrial trucks 2.1 to 2.4 are depicted. Each of the industrial trucks, which, as before, are also generally referred to by reference numeral 2, can be configured in the same way as has been explained in connection with FIGS. 1 to 3. The industrial trucks 2.1 to 2.4 are each connected to a charging unit 22.1 to 22.4 via a corresponding charging cable 24. The charging units 22.1 to 22.4 are, in turn, coupled to a central computer 36 of the logistics system 32 via suitable data lines 34.

The central computer 36 comprises a comparison unit 38 (controller). The first industrial truck 2.1 comprises a first control unit 16.1, which is configured to capture a first internal vehicle state parameter P1 of the first industrial truck 2.1 and to transmit it to the comparison unit 38. By way of example, the data is transmitted via the first charging unit 22.1. Alternatively, it can also take place via a direct data connection between the first industrial truck 2.1 and the central computer 36. The second industrial truck 2.2 comprises a second control unit 16.2, which is configured to capture a second internal vehicle state parameter P2. The second industrial truck 2.2 also transmits the vehicle state parameter P2 to the comparison unit 38, wherein what has already been said regarding the first industrial truck 2.1 applies with regard to the data transmission.

The comparison unit 38 is configured to compare the first and the second vehicle state parameter P1, P2 with one another. The vehicle state parameters P1, P2 can be, for example, a state of charge of the respective traction battery 14 of the industrial truck 2.1, 2.2 or any other vehicle state parameter. The comparison unit 38 produces a comparison result and generates a first and a second control signal S1 or, respectively S2. The first control signal S1 characterizes a ratio of the first vehicle state parameter P1 to the comparison result. The second control signal S2 characterizes a ratio of the second vehicle state parameter P2 to the comparison result. If the vehicle state parameters P1, P2 are, for example, the state of charge of the traction battery 14, the maximum state of charge is, for example, established as the comparison result. If, for example, the state of charge of the traction battery 14 of the first industrial truck 2.1 is 80% and the state of charge of the traction battery 14 of the second industrial truck 2.2 is 60%, the comparison result would be 80%. The individual vehicle state parameters P1, P2 are now quantified with respect to this comparison result. The second vehicle state parameter (60% state of charge) is less than the comparison result (80% state of charge). Accordingly, an item of information relating to the display of a red light signal could be generated, for example, as the second control signal S2. By way of contrast, the first control signal S1 would produce a green light signal, since the state of charge of the traction battery 14 of the first industrial truck 2.1 corresponds to the maximum value. The comparison unit 38 is configured to transmit the first control signal S1 to the first control unit 16.1 of the first industrial truck 2.1. Equally, the second control signal S2 is transmitted to the second control unit 16.2 of the second industrial truck 2.2. The data communication can, in turn, take place via the relevant charging units 22.1 or, respectively 22.2. A direct, for example, wireless communication between the central computer 36 and the industrial trucks 2.1, 2.2 or, respectively the control units 16.1, 16.2 thereof can also be provided.

The first control unit 16.1 of the first industrial truck 2.1 is now configured to actuate a vehicle light 6 of the first industrial truck in a first pattern. Said first pattern is, for example, a green light and is based on the first control signal S1. The second control unit 16.2 of the second industrial truck 2.2 is configured to actuate the vehicle light 6 of said industrial truck in a second pattern based on the second control signal S2. This would be, for example, the reproduction of a red light signal.

The comparison explained above, by way of example, for the first and the second industrial truck 2.1, 2.2 can equally be performed with reference to multiple vehicle state parameters, for example comparing a third vehicle state parameter P3 of the third industrial truck 2.3 with a fourth vehicle state parameter P4 of the fourth industrial truck 2.4. In such a case, not only does the comparison unit 38 perform a comparison between a first and a second vehicle state parameter P1, P2, but rather between multiple vehicle state parameters, for example, the four vehicle state parameters P1 to P4 of the four industrial trucks 2.1 to 2.4. In turn, a comparison result is established and the individual vehicle state parameters P1 to P4 are quantified with respect to the established comparison result. Based on said comparison, control signals S1 to S4 are produced and the respective control units 16.1 to 16.4 of the industrial trucks 2.1 to 2.4 subsequently produce corresponding light signals at the respective vehicle lights 6. For example, the vehicle light 6 of that industrial truck which has the highest state of charge of the traction battery 14 will shine green.

Figure 5:
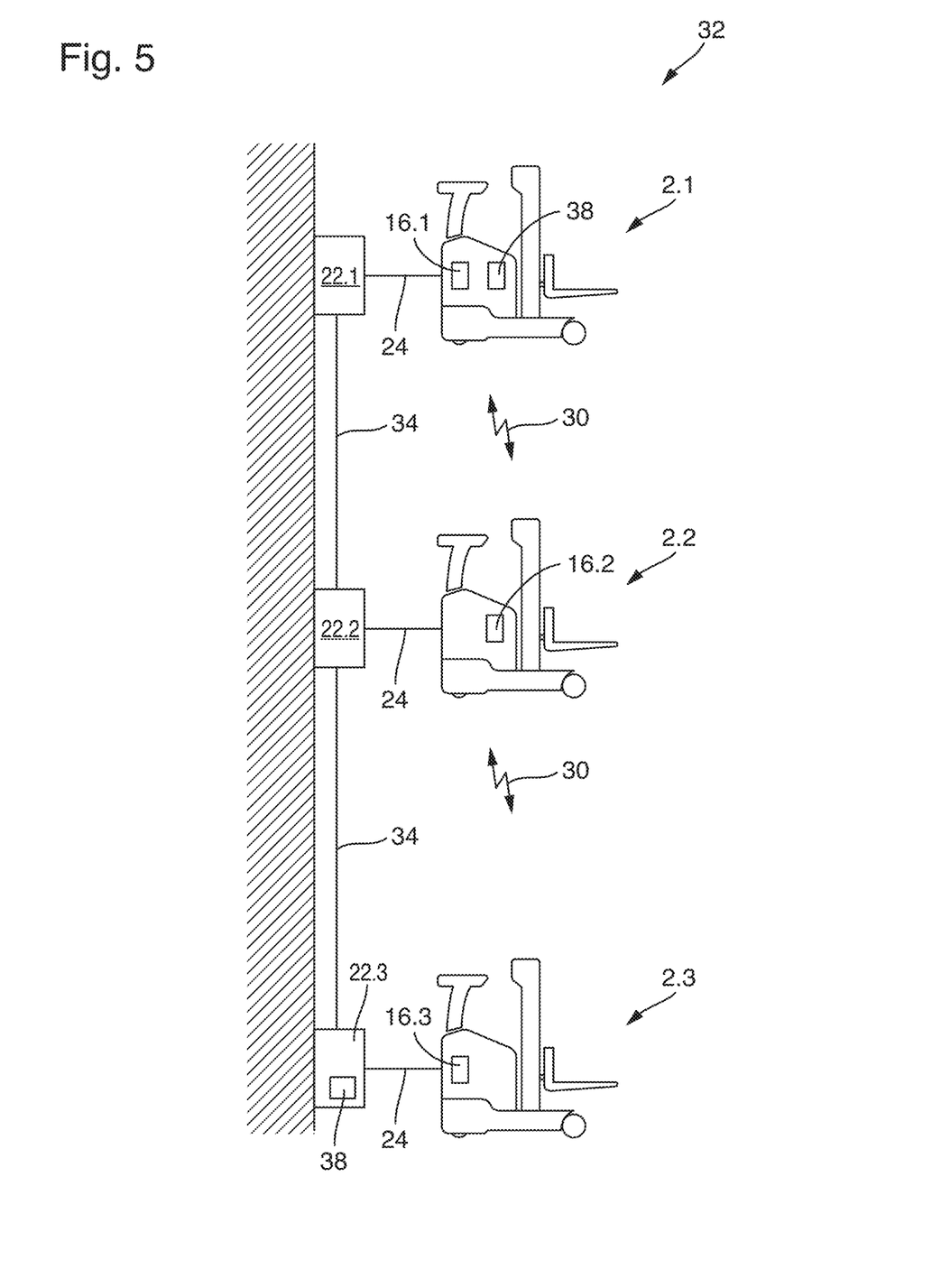

FIG. 5 shows a further logistics system 32, by way of example comprising three industrial trucks 2.1 to 2.3. By way of derogation from the logistics system 32 explained in connection with FIG. 4, the logistics system 32 depicted in FIG. 5 does not have a central computer 36. Instead, the comparison unit 38 is located in one of the industrial trucks 2.1 to 2.3, by way of example in the first industrial truck 2.1. The comparison unit 38 can be implemented as part of the vehicle controller 20 of said industrial truck 2.1 or as part of the first control unit 16.1 of the industrial truck 2.1. To ensure that the communication of the vehicle state parameters P1 to P3 and the control signals S1 to S3, which are required in connection with the processing of multiple vehicle state parameters, can take place, the industrial trucks 2.1 to 2.3 are directly coupled to one another via wireless data connections 30, so that all of the industrial trucks 2.1 to 2.3 can communicate with one another. According to a further embodiment, it is provided that the comparison unit 38 is implemented in one of the charging units 22.1 to 22.3. This is depicted by way of example for the third charging unit 22.3. In order for the required data exchange to take place, as already mentioned, the charging units 22.1 to 22.3 are connected to one another by suitable data lines 34, so that, starting from the industrial trucks 2.1 to 2.3, the vehicle state parameters P1 to P3 can reach the comparison unit 38 via the charging units 22.1 to 22.3. In the opposite direction, the control signals S1 to S3 are communicated, starting from the comparison unit 38, in turn via the charging units 22.1 to 22.3 to the industrial trucks 2.1 to 2.3 or, respectively to the control units 16.1 to 16.3 thereof.

According to a further exemplary embodiment, the logistics system 32 is configured in that it comprises at least one charging unit 22 and an electrically driven industrial truck 2. The industrial truck 2 comprises a lighting device 4 which, in turn, comprises at least one vehicle light 6. In addition, the industrial truck comprises a control unit 16 for actuating the vehicle light 6. The control unit 16 of the industrial truck 2 is configured to capture at least one state parameter of the charging unit 22 and to actuate the vehicle light 6 in a pattern based on the at least one state parameter of the charging unit 22. For example, the state parameter of the charging unit 22 can provide information about the performance, operational readiness or a service requirement thereof. The exemplary embodiments previously explained with respect to the industrial truck 2 apply in the same way to such a logistics system 32, wherein the state parameter of the industrial truck 2 is merely to be replaced by the state parameter of the charging unit 22. According to a further embodiment, it is provided that the state parameter of the charging unit 22 is not directly exchanged between the industrial truck 2 and the charging unit 22. For this purpose, the logistics system 32 comprises a central computer 36, which can equally be implemented in a cloud. The central computer 36 requests, for example, the state parameter of the charging unit 22 from the charging unit 22 and communicates the latter to the industrial truck 2. Equally, it can be provided that the industrial truck 2 requests the state parameter of the charging unit 22 from the central computer 36.

The various control units and comparison units can be implemented as a single controller configured to perform each of the functions of the various units therein or as separate controllers or computing modules within the control unit or comparison unit and can each be configured as dedicated hardware circuits or software implemented on hardware controllers/computing modules.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

LIST OF REFERENCE NUMERALS 2, 2.1 to 2.4 Industrial truck
4 Lighting device
6, 6.1, 6.2 Vehicle lights
8 Body
10 Mast
12 Lifting fork
14 Traction battery
16, 16.1 to 16.4 Control unit
18 Connection line
20 Vehicle control
22, 22.1 to 22.4 Charging unit
24 Charging cable
26 Proximity signal
28 User end device
30 Wireless data connection
32 Logistics system
34 Data line
36 Central computer
38 Comparison unit
P1 First vehicle state parameter
P2 Second vehicle state parameter
S1 First control signal
S2 Second control signal

What is claimed is:

1. An industrial truck comprising:
at least one vehicle light; and
a controller comprising hardware configured to actuate the at least one vehicle light, wherein the controller is configured to capture at least one vehicle state parameter and to actuate the at least one vehicle light in a pattern based on the at least one vehicle state parameter;
wherein the controller is further configured to capture a proximity signal and, in response to a successful capturing of the proximity signal, to activate an actuation of the at least one vehicle light;
the vehicle state parameter is linked to multiple authorization categories and the proximity signal comprises an item of information relating to an authorization category, and
the controller is further configured, in response to a successful capturing of the proximity signal, to compare the authorization category of the vehicle state parameter and the authorization category of the proximity signal and to actuate the at least one vehicle light as a function of the comparison.

2. The industrial truck according to claim 1, further comprising a body, wherein the at least one vehicle light is arranged in one of a top half, a top third or a top quarter of the body.

3. The industrial truck according to claim 1, wherein the at least one vehicle light is a part of the vehicle lighting of the industrial truck.

4. The industrial truck according to claim 1, wherein the vehicle state parameter is one or more of an equipment feature of the industrial truck, a state of charge of a traction battery of the industrial truck, an operational readiness of the industrial truck and a service requirement of the industrial truck.

5. The industrial truck according to claim 1, wherein the vehicle state parameter is an internal vehicle state parameter and the pattern characterizes a value of the vehicle state parameter.

6. The industrial truck according to claim 1, wherein the vehicle state parameter is an internal vehicle state parameter and the controller is further configured to capture the internal vehicle state parameter and at least one vehicle state parameter of at least one further industrial truck as at least one external vehicle state parameter, to compare the at least one internal state parameter and the at least one external vehicle state parameter with one another and to actuate the at least one vehicle light in a pattern based on the comparison.

7. A logistics system comprising:
at least one charging unit; and
an electrically driven industrial truck comprising:
at least one vehicle light; and
a controller comprising hardware configured to actuate the at least one vehicle light, wherein the controller is configured to capture at least one state parameter of the charging unit and to actuate the at least one vehicle light in a pattern based on the at least one state parameter of the charging unit.

8. A logistics system comprising:
a comparison controller;
a first industrial truck comprising:
   at least one first vehicle light; and
   a first controller comprising hardware configured to actuate the at least one first vehicle light, wherein the first controller is configured to capture at least one first internal vehicle state parameter and to actuate the at least one first vehicle light in a first pattern based on the at least one first internal vehicle state parameter; and
a second industrial truck comprising:
   at least one second vehicle light; and
   a second controller comprising hardware configured to actuate the at least one second vehicle light, wherein the second controller is configured to capture at least one second internal vehicle state parameter and to actuate the at least one second vehicle light in a second pattern based on the at least one second internal vehicle state parameter;
wherein the first controller is configured to transmit the at least one first internal vehicle state parameter to the comparison controller and the second controller is configured to transmit the at least one second internal vehicle state parameter to the comparison controller,
the comparison controller is configured to compare the at least one first internal vehicle state parameter and the at least one second internal vehicle state parameter with one another, to produce a comparison result and to generate a first control signal and a second control signal,
the first control signal characterizes a ratio of the at least one first internal vehicle state parameter to the comparison result and the second control signal characterizes a ratio of the at least one second internal vehicle state parameter to the comparison result,
the comparison controller is further configured to transmit the first control signal to the first controller and to transmit the second control signal to the second controller unit, and
the first controller unit is configured to actuate the at least one first vehicle light in the first pattern based on the first control signal and the second controller is configured to actuate the at least one second vehicle light in the second pattern based on the second control signal.

9. The logistics system according to claim 8, wherein the comparison controller comprises a central computer, wherein the central computer is coupled by data technology to the first industrial truck and to the second industrial truck.

10. The logistics system according to claim 8, wherein the comparison controller is arranged in one of the first industrial truck or the second industrial truck and the first industrial truck and the second industrial truck are directly coupled by data technology to one another.

11. The logistics system according to claim 8, further comprising a first charging unit for charging a first traction battery of the first industrial truck connected to the first industrial truck and a second charging unit for charging a second traction battery of the second industrial truck connected to the second industrial truck,
wherein the comparison controller is arranged in one of the first charging unit or the second charging unit, and the first charging unit and the second charging unit, the first charging unit and the first industrial truck and the second charging unit and the second industrial truck are coupled by data technology to one another.

12. A method for operating the logistics system according claim 10, the method comprising:
capturing the first internal vehicle state parameter and;
capturing the second internal vehicle state parameter;
comparing the first internal vehicle state parameter and the second internal vehicle state parameter with one another to produce a comparison result;
generating a first control signal and a second control signal, wherein the first control signal characterizes a ratio of the first internal vehicle state parameter to the comparison result and the second control signal characterizes a ratio of the second internal vehicle state parameter to the comparison result, and
actuating the at least one first vehicle light in the first pattern based on the first control signal and actuating the at least one second vehicle light in the second pattern based on the second control signal.

13. The method according to claim 12, wherein the logistics system comprises a first charging unit and a second charging unit, wherein the method further comprises:
the first charging unit charging a first traction battery of the first industrial truck;
the second charging unit charging a second traction battery of the second industrial truck,
arranging the comparison controller in one of the first charging unit or the second charging unit, and
connecting the first charging unit and the second charging unit, the first charging unit and the first industrial truck and the second charging unit and the second industrial truck with one another by data technology.

14. A method for operating a lighting device of an industrial truck, the method comprising:
capturing at least one vehicle state parameter; and
actuating the at least one vehicle light of the industrial truck in a pattern based on the at least one vehicle state parameter;
wherein the vehicle state parameter is an internal vehicle state parameter and the method further comprises:
capturing the internal vehicle state parameter and at least one vehicle state parameter of at least one further industrial truck as at least one external vehicle state parameter,
comparing the internal vehicle state parameter and the at least one external vehicle state parameter with one another; and
actuating the at least one vehicle light in a pattern based on the comparison.

15. The method according to claim 14, wherein the internal vehicle state parameter is one or more of an equipment feature of the industrial truck, a state of charge of a traction battery of the industrial truck, an operational readiness of the industrial truck and a service requirement of the industrial truck.

16. The method according to claim 14, further comprising:
capturing a proximity signal and,
in response to a successful capturing of the proximity signal, activating an actuation of the at least one vehicle light.

17. The method according to claim 16, wherein the internal vehicle state parameter is linked to multiple authorization categories and the proximity signal comprises an item of information relating to an authorization category, and wherein, in response to a successful capturing of the proximity signal, the method further comprising comparing the authorization category of the vehicle state parameter and the authorization category of the proximity signal; and actuating the at least one vehicle light as a function of the comparison.

18. The method according to claim 14, wherein the pattern characterizes a value of the internal vehicle state parameter.

* * * * *